(12) United States Patent
Faruque et al.

(10) Patent No.: US 9,154,228 B2
(45) Date of Patent: Oct. 6, 2015

(54) METHOD AND APPARATUS FOR SIGNAL RECEPTION WITH AMBIENT LIGHT COMPENSATION

(71) Applicant: University of North Dakota, Grand Forks, ND (US)

(72) Inventors: Shams Faruque, Grand Forks, ND (US); Saleh Faruque, Grand Forks, ND (US); William Semke, Larimore, ND (US)

(73) Assignee: University of North Dakota, Grand Forks, ND (US)

( * ) Notice: Subject to any disclaimer, the term of this patent is extended or adjusted under 35 U.S.C. 154(b) by 451 days.

(21) Appl. No.: 13/652,256

(22) Filed: Oct. 15, 2012

(65) Prior Publication Data

US 2014/0105608 A1 Apr. 17, 2014

(51) Int. Cl.
*G01J 1/44* (2006.01)
*H04B 10/00* (2013.01)
*H04B 10/112* (2013.01)

(52) U.S. Cl.
CPC .................................. *H04B 10/1123* (2013.01)

(58) Field of Classification Search
CPC ..... H04B 10/11; H04B 10/12; H04B 10/1123
USPC .................. 250/214 AL, 214 B; 398/118, 119
See application file for complete search history.

(56) References Cited

U.S. PATENT DOCUMENTS

| | | | |
|---|---|---|---|
| 4,309,604 A * | 1/1982 | Yoshikawa et al. | 250/226 |
| 4,821,338 A * | 4/1989 | Naruse et al. | 356/227 |
| 5,001,336 A | 3/1991 | de la Chapelle | |
| 5,282,073 A | 1/1994 | Defour et al. | |
| 5,684,294 A | 11/1997 | Kouhi | |
| 6,111,425 A | 8/2000 | Bertin et al. | |
| 6,208,445 B1 | 3/2001 | Reime | |
| 6,574,022 B2 | 6/2003 | Chow et al. | |
| 6,724,247 B2 | 4/2004 | Mattisson et al. | |
| 7,218,860 B2 | 5/2007 | Tan et al. | |
| 7,268,881 B2 * | 9/2007 | Larsen et al. | 356/436 |
| 7,531,776 B2 * | 5/2009 | Koide | 250/205 |
| 2007/0297813 A1 | 12/2007 | Urata et al. | |

OTHER PUBLICATIONS

"RC Airplane Controls", from <http://www.hooked-on-rc-airplanes.com/m-airplane-controls.html>, visited Sep. 27, 2012, 4 pages.
"Unmanned aerial vehicle", from <https://en.wikipedia.org/wiki/Unmanned_aerial_vehicle>, visited Sep. 27, 2012, 23 pages.

\* cited by examiner

*Primary Examiner* — Thanh Luu
(74) *Attorney, Agent, or Firm* — Kinney & Lange, P.A.

(57) ABSTRACT

A free space communications apparatus includes a first receiving element configured to receive a communication signal and an ambient noise signal and to generate a first current as a function of any and all received signals, a second receiving element electrically coupled with the first receiving element to receive the ambient noise signal and to generate a second current as a function of any and all received signals, and an output signal produced as a function of the communication signal received by the first receiving element. The first and second receiving elements are electrically connected in a circuit that cancels at least a portion of the first current as a function of the second current to produce the output signal.

26 Claims, 10 Drawing Sheets

METHOD AND APPARATUS FOR SIGNAL RECEPTION WITH AMBIENT LIGHT COMPENSATION

STATEMENT OF GOVERNMENT INTEREST

This invention was made with government support under FA4861-06-C-0006 awarded by The United States Department of Defense and FA8650-09-C1600 awarded by the United States air Force Research Laboratory. The government has certain rights in the invention.

BACKGROUND

The present invention relates generally to signal reception systems and methods for free space communication, and more particularly to signal reception systems and methods for free space communication with compensation for ambient noise signals.

Photo detectors can be used to detect laser signals to support high-speed data communications for a variety of applications, such as for ground-to-air, air-to-air and other types of Unmanned Aerial Vehicle (UAV) communications, deep space communications, and underwater submersible communications. However, unwanted ambient light (or other noise signals) often causes the photo detector to saturate, causing an undesirable signal-to-noise (S/N) ratio. Saturation is generally not a problem during nighttime conditions, when ambient light levels are low. However, during daytime conditions, sunlight can produce a direct current (DC) photo current and cause the photo detector to saturate, making a desired communication signal (e.g., laser beam signal) undetectable. Moreover, in deep space application, sunlight and other atmospheric conditions can produce similar saturation problems. Filters are sometimes used to reduce saturation, including optical filters, colored and neutral density filters, and low, band pass, and high pass filters. However, known filters have not performed well. Some receivers don't have any kind of filtering, and use computers to sift through all the signals to receive the correct one. Computerized signal analysis has drawbacks, such as requiring complex equipment and software. All of these filtering and computer processing methods have the effect of reducing signals from unwanted bandwidths while keeping others, and when they are placed with photo-diodes, are often called 'daylight' filters. None of these known methods truly cancels out all unwanted ambient signals; they only diminish the power of signals in unwanted bandwidths.

Known optical laser receivers, in their most basic construction, consist of one photo-detector. Such a known communication system is illustrated in FIG. 1, which shows laser transmitter 10 having a laser illustrated as diode D1 and a receiver 12 having a single optical receiver element illustrated as photo detector diode D2. In the absence of any kind of filtering, sunlight received by the photo diode D2 of the receiver 12 will produce a strong DC current. Strong sunlight will indeed overpower a laser signal from the diode D1, which may have been transmitted a great distance away from the receiver 12. An output voltage $V_O$ of the system of FIG. 1 can be represented by Equation 1, where $I_A$ is current produced by ambient noise such as ambient light (e.g., sunlight) and any and all other received ambient noise, $I_L$ is current produced by a signal from the transmitter 10, and R2 is the resistance of a resistor R2 in the receiver 12:

$$V_O = (I_A + I_L) \bullet R2 \quad (1)$$

Discerning a laser signal is difficult amid all the background noise received by the photo-detector diode D2. Known filters and computerized processing methods are simply not good enough to eliminate all the unwanted noise, including sunlight. As a result, some believe that these saturation problems mean optical free space communication system are not feasible for many applications, such as for UAV communications.

Thus, additional techniques are needed to further reduce problems of atmospheric or other ambient noise in communication signal reception.

SUMMARY

A free space communications apparatus includes a first receiving element configured to receive a communication signal and an ambient noise signal and to generate a first current as a function of any and all received signals, a second receiving element electrically coupled with the first receiving element to receive the ambient noise signal and to generate a second current as a function of any and all received signals, and an output signal produced as a function of the communication signal received by the first receiving element. The first and second receiving elements are electrically connected in a circuit that cancels at least a portion of the first current as a function of the second current to produce the output signal.

While the above-identified figures set forth embodiments of the present disclosure, other embodiments are also contemplated, as noted in the discussion. In all cases, this disclosure presents the invention by way of representation and not limitation. It should be understood that numerous other modi-

DETAILED DESCRIPTION

In general, the present invention provides a free space signal transmission system and associated sign reception apparatus and method that allows an output signal to be generated by the reception apparatus as a function of a received free space communication signal with ambient noise signals (e.g., sunlight) substantially canceled, such that the output signal has a relatively high signal-to-noise (S/N) ratio. A receiver circuit that cross-couples an even number of signal receivers in a differential configuration can cancel out any common signal input. For example, a laser communication signal system, in a simple embodiment, can electrically cross-couple two photo receiver devices (or a greater, even number of receiver devices) in a receiver circuit apparatus, with an effect being that, in an absence of a received laser communication signal, received ambient noise signals are canceled and a net output power is zero or close to zero. In one such embodiment, a desired communication signal is focused upon and transmitted into only one of the receiver devices, with another of the receiver devices receiving only ambient noise signals (e.g., sunlight) but not the desired communication signal. The receiver devices can be positioned adjacent one another in close proximity, such that ambient noise signals received by each device are substantially equal. The cross-coupled photo receiver devices can thereby cancel out ambient noise signals that received by both of the receiver devices. With all other signals being cancelled out, the desired communication signal is an overwhelmingly dominant signal in a resultant output. The desired communication signal can then be received with relatively little noise, and subsequent signal processing can be made easier. For embodiments utilizing optical signal transmission, the photo receiver devices can be photo detectors, solar cell array modules, or other receptor devices. Typically, the signal reception devices will be configured to each generate an electrical current as a function of any and all received signals, such that separate currents are generated for each detector element. In further embodiments, operational amplifiers can be used to reduce parasitic capacitance in receiver circuitry. Moreover, the present invention can be used in conjunction with filtering and/or post-reception signal processing, but in some embodiments such filtering and processing can be omitted entirely, as desired. Additional features and embodiments of the present invention will be better understood in view of the description that follows, and in view of the accompanying drawings.

Figure 2:
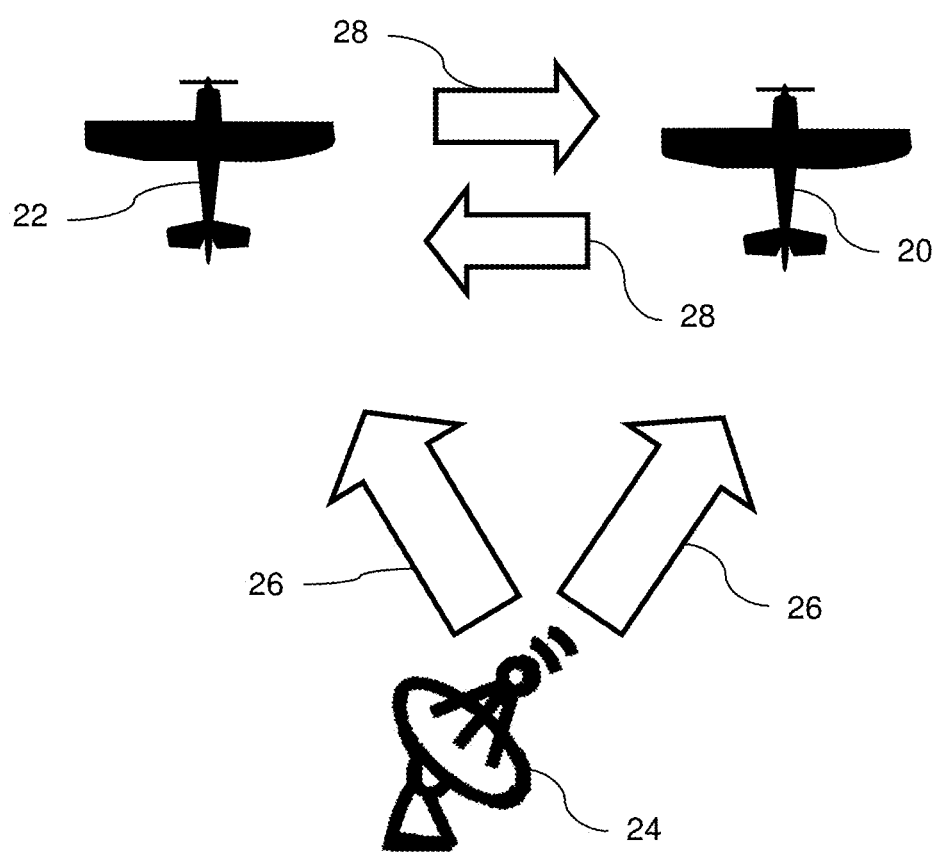
FIG. 2 is a schematic representation of an embodiment of a communication system for use with aerial vehicles.

FIG. 2 is a schematic representation of an embodiment of a communication system for use with aerial vehicles 20 and 22, such as unmanned aerial vehicles. A ground-based node 24 is provided that can selectively transmit ground-to-air narrow-beam, line-of-sight communication signals 26 to either or both of the airborne vehicles 20 and 22. Furthermore, air-to-air narrow-beam, line-of-sight communication signals 28 can be transmitted between the aerial vehicles 20 and 22. In one embodiment, the narrow-beam, line-of-sight communication signals 26 and 28 can be laser-based communication beam signals. Nearly any type of communication signal protocol can be used, as desired for particular applications, such as amplitude modulation, frequency modulation, on/off keying, orthogonal on/off, etc. Line-of-sight communications may be desirable for particular applications due to increased security of transmission, reduced signal detectability, and reduced risk of undesired signal jamming/blocking.

It should be noted that the embodiment illustrated in FIG. 2 is provided merely by way of example and not limitation. In further embodiments, communications with an underwater submersible, purely land-based communication nodes (e.g., automobiles, buildings, etc.), deep space vehicles and/or satellites, other applications are possible.

Figure 3:
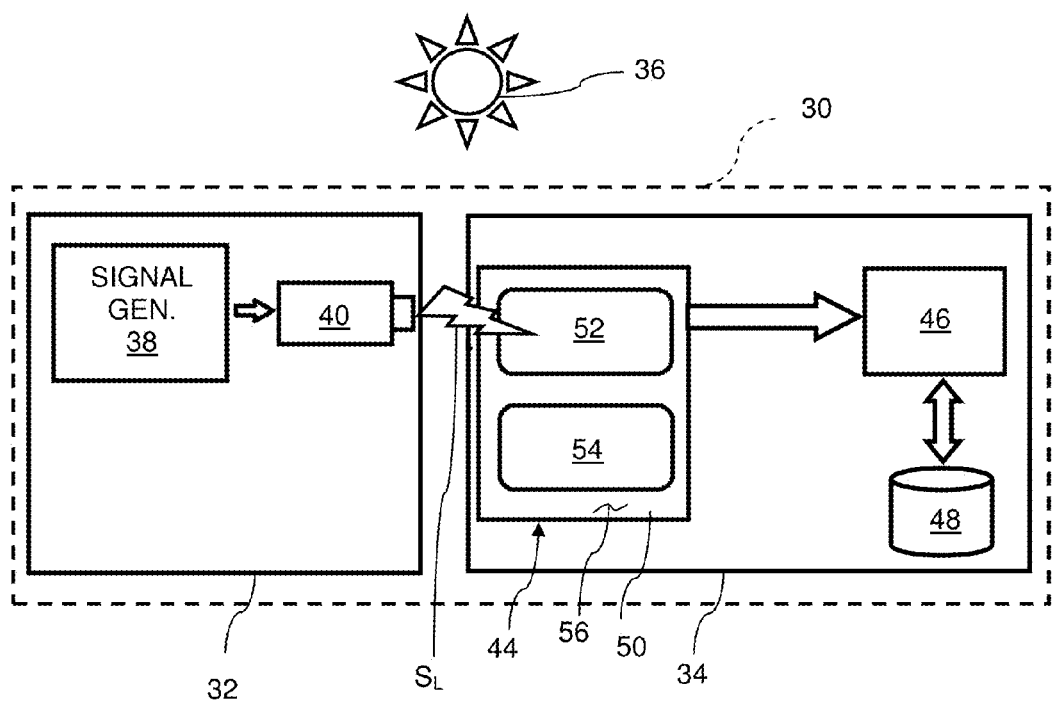
FIG. 3 is a schematic block diagram of an embodiment of a free space signal transmission and reception system according to the present invention.

FIG. 3 is a schematic block diagram of an embodiment of a free space signal transmission and reception system 30, which can be used with the vehicles 20 and 22 and/or node 24 of FIG. 2 or in other applications. The system 30 of the illustrated embodiment includes a transmitter apparatus 32 and a receiver apparatus 34. As shown in FIG. 3, at least one ambient noise signal source 36 (e.g., sunlight) can be present in proximity to the system 30.

The transmitter apparatus 32, as shown in FIG. 3, includes a signal generator 38 and a transmitter element 40. In one embodiment, the transmitter element 40 can be a laser. In further embodiments, the transmitter element 40 can be configured to produce another type of narrow-beam, line-of-sight communication signal (e.g., narrow beam microwave) using any desired electromagnetic signal format. The signal generator 38 can control and govern modulation of a communication signal $S_L$ (e.g., communication laser beam) generated by the transmitter element 40, and can incorporate suitable processing hardware and software/firmware. The signal generator 38 and the transmitter element 40 can each have any suitable configuration to generate and transmit the communication signal $S_L$ in a desired format. For instance, where the transmitter element 40 is a laser and the communication signal $S_L$ is a laser beam, laser beam can be an infrared (IR) beam, a visible spectrum beam, or any other type of beam desired for a particular application. It should be noted that the transmitter apparatus 32 is shown in FIG. 3 in simplified schematic form. Various additional components not shown in FIG. 3 can be included in further embodiments. For example, an aiming and tracking system (not shown) can be utilized to facilitate aiming the communication signal $S_L$.

The receiving apparatus 34, as shown in FIG. 3, includes a receiver subassembly 44, a computer 46, and computer-readable memory 48. The receiver subassembly 44 in the illustrated embodiment includes a substrate 50 and receiver elements 52 and 54. The receiver elements 52 and 54 can each be photo detectors, solar panel array modules, or other receiver elements capable of receiving optical signals. In a preferred embodiment, the receiver elements 52 and 54 are identically configured, such that each element 52 and 54 can receive signals and generate identical or substantially identical outputs (e.g., output currents) based on the same or substantially the same inputs (e.g., ambient light or other ambient noise). For instance, the receiver elements 52 and 54 can be positioned adjacent to one another in close proximity, facing in the same direction, such the noise signal source 36 impinges equally or substantially equally on both receiver elements 54 and 56. The computer 46 can be any suitable computer having one or more processor, and can optionally include signal processing capabilities in the form of suitable hardware and/or software/firmware. The computer readable memory 48 can take any suitable form, and is accessible by the computer 46 for read and/or write functionality. Signals received by the receiver subassembly 44 and other data can be stored in the memory 48 for later retrieval.

The receiver subassembly 44 can comprise a single unit in one preferred embodiment. For example, the receiver elements 52 and 54 can both be formed adjacent one another in a closely-spaced relationship on a single surface 56 of the substrate 50. A single-unit, single integrated circuit construction is particularly advantageous when the receiver elements 52 and 54 comprise solar panels or solar cell array modules. As explained further below, it is desirable for the receiver elements 52 and 54 to detect the same or substantially the same ambient noise signals, and receiver elements formed on the same surface 56 of a single substrate 50 are less likely to exhibit performance variations, such as those related to manufacturing tolerance and fabrication-related structural differences. In other words, matching and signal cancelling can be enhanced when the receiver elements 52 and 54 are as identical as possible. Although slight manufacturing-related variations are common (and inevitable), a single-substrate embodiment can help reduce associated performance degradation. In alternative embodiments, the receiver subassembly 44 can be made up of any number of physically separate structures or panels that make up at least two receiver elements 52 and 54. For instance, more than two receiver elements can be provided, though typically an even number of receiver elements are utilized. Moreover, the individual receiver elements 52 and 54 can themselves be made up of any number of solar cells in an array module, each have any desired configuration.

In an unmanned aerial vehicle applications, deep space applications, and other desired implementations, the receiver elements 52 and 54 of the receiver subassembly 44 can each have a relatively large surface area, such as on the order or square centimeters to square meters of surface area. Generally speaking, receiver element surface area may increase with increasing free space communication signal transmission distances. A large surface area facilitates directing the communication signal $S_L$ on a selected one of the receiver elements 52 or 54, without impinging the communication signal $S_L$ on the other one of the receiver elements 52 or 54. In some embodiments, the communication signal $S_L$ (e.g., a laser beam) can be focused on a region that falls within a perimeter of the selected one of the receiver elements 52 or 54.

Figure 4A:
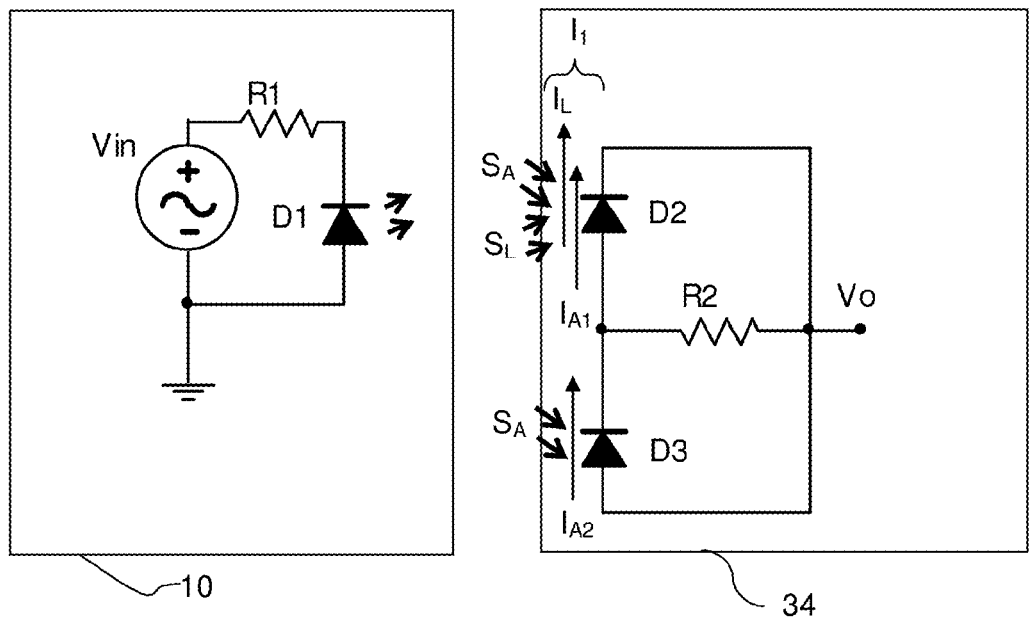
FIG. 4A is an electrical circuit diagram of an embodiment of the system of FIG. 3.

FIG. 4A is an electrical circuit diagram of one embodiment of the system 30, which includes a transmitter 10 and the receiver 34. For simplicity, the computer 46 and the memory 48 of the system 30 are not shown in FIG. 4A. In the illustrated embodiment, the transmitter includes an alternating current (AC) voltage source $V_{in}$, a resistor R1, and a diode D1. The diode D1 can be a laser diode. Although illustrated as a single diode D1, additional laser diodes can be provided in further embodiments. Moreover, the representation of the transmitter 10 in FIG. 4A is highly simplified, and is provided merely by way of example and not limitation. Those of ordinary skill in the art will recognize that other implementations of a suitable transmitter are possible in further embodiments. For instance, additional components not specifically shown can be utilized as desired.

As shown in FIG. 4A, the receiver 34 includes a circuit having diodes D2 and D3 electrically connected together in a cross-coupled configuration, and a resistor R2 connected between the diodes D2 and D3 to an output. An output signal can be produced by the circuit, which can be in the form of a voltage output $V_O$. The diodes D2 and D3 can each be photodiodes or other light-sensitive elements that can generate a current as a function of light input. Each of the diodes D2 and D3 can generate a current, in direct current (DC) form, as a function of received signals (i.e. received energy). A current $I_1$ can be generated by the diode D2 as a function of any and all received signals, for instance, as a total current produced by a current $I_L$ generated as a function of the received communication signal $S_L$ and a current $I_{A1}$ generated as a function of a received ambient noise signal $S_A$ (such as from the noise source 36 shown in FIG. 3). A current $I_{A2}$ can be generated by the diode D3 as a function of the received ambient noise signal $S_A$. The cross-coupled configuration can involve the diode D2 having a cathode facing an output terminal of the circuit and the diode D3 having an anode facing the output terminal of the circuit, which, as a result of the separate input currents $I_1$ and $I_{A2}$ generated by the diodes D2 and D3, causes a cancellation effect for equivalent currents $I_{A1}$ and $I_{A2}$ generated by both diodes D2 and D3. This results in a net output of only the current $I_L$ generated by the received communication signal $S_L$ at one of the diodes (D2).

An output of the circuit shown in FIG. 4A is governed by Equation 2, where $V_O$ is the output voltage signal, $I_L$ is a current generated as a function of the received communication signal $S_L$, and R2 is a resistance of the resistor R2:

$$V_O = I_L \bullet R2 \qquad (2)$$

Accordingly, photo current due to any ambient noise signal $S_A$ (e.g., sunlight) is canceled, due to cross-coupling of the two photo-diodes D2 and D3. It is presumed that the ambient noise signal $S_A$ is essentially equally received by both diodes D2 and D3 for complete cancellation to occur. Thus, when two signal generating photo-receptors are arranged such that when they are opposed to one another, such as in the configuration shown in FIG. 4A, the effect is a cancelation of ambient noise, if the both photo-receptors receive the same amount of noise input. As used herein, the term cancellation refers to cancellation of signals received by each receiving element, and is intended to encompass situations in which incidental variations in signal reception at different receiving elements leads to incidental variations and inequalities in generated currents.

Figure 4B:
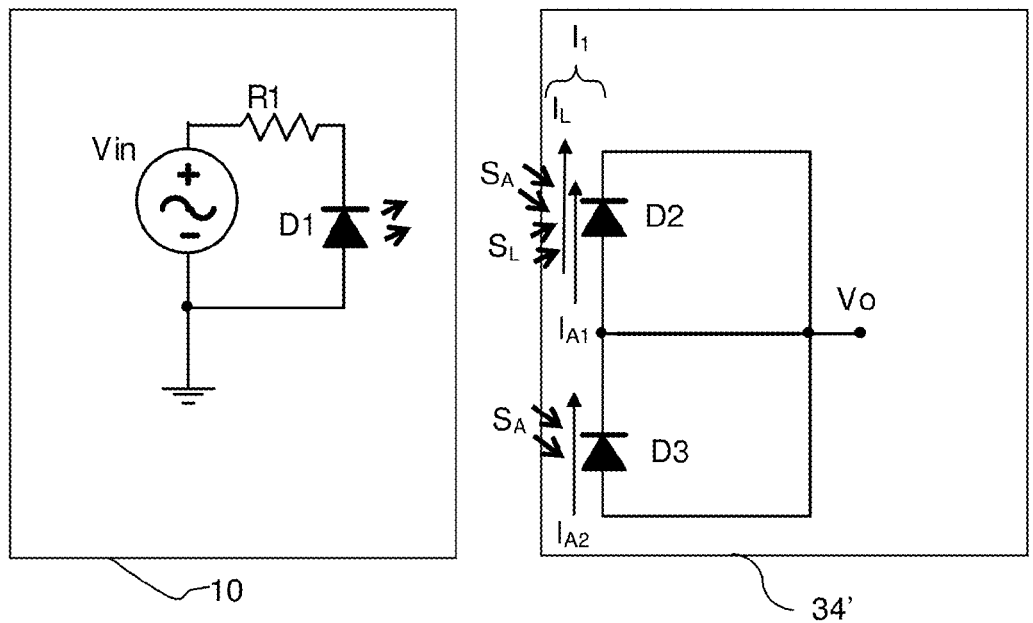
FIG. 4B is an electrical circuit diagram of another embodiment of the system of FIG. 3.

FIG. 4B is an electrical circuit diagram of another embodiment of the system 30, which includes a transmitter 10 and a receiver 34'. The embodiment shown in FIG. 4B is generally similar to that shown in FIG. 4A, however, the resistor R2 is omitted in the receiver 34'.

Figure 4C:
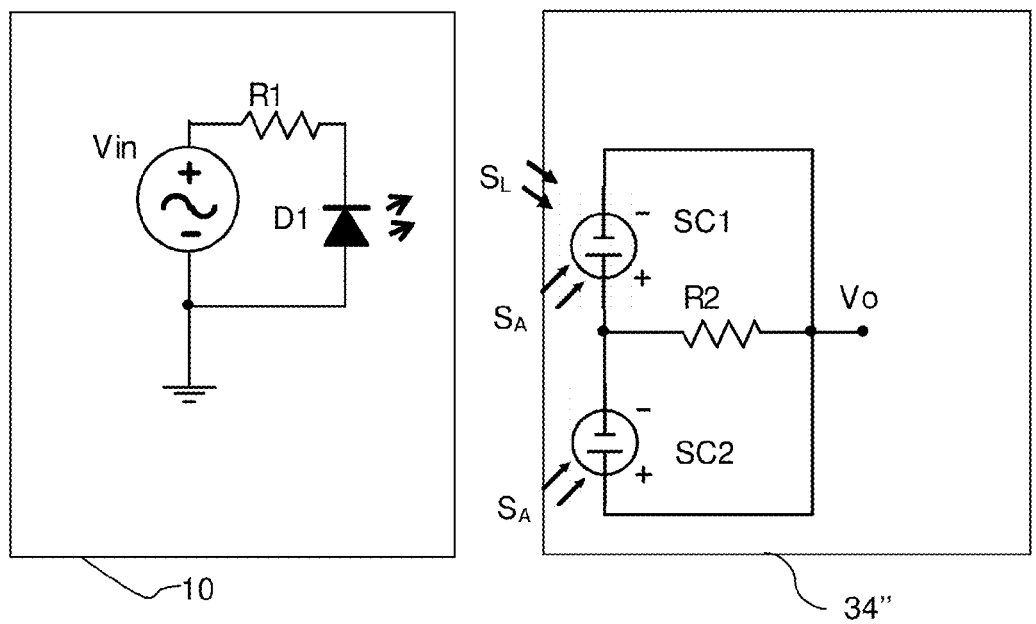
FIG. 4C is an electrical circuit diagram of another embodiment of the system of FIG. 3.

FIG. 4C is an electrical circuit diagram of yet another embodiment of the system 30, which includes a transmitter 10 and a receiver 34". The embodiment shown in FIG. 4C is generally similar to that shown in FIG. 4A, however, the diodes D2 and D3, respectively, are instead represented as solar cell modules SC1 and SC2 (which can each include any desired number of individual solar cells for given embodiment) that can each produce a current (i.e., using a photovoltaic effect to in turn produce a current) as a function of received signals. For simplicity, the currents generated as a function of received signals are not specifically shown in FIG. 4C.

It should be recognized that FIGS. 4A, 4B and 4C are a highly simplified representations of possible circuitry that can be used in conjunction with the present invention. Those figures are presented merely by way of example and not limitation. For instance, various other, additional circuit elements that are not specifically shown can be utilized as desired for particular applications.

Figure 5A:
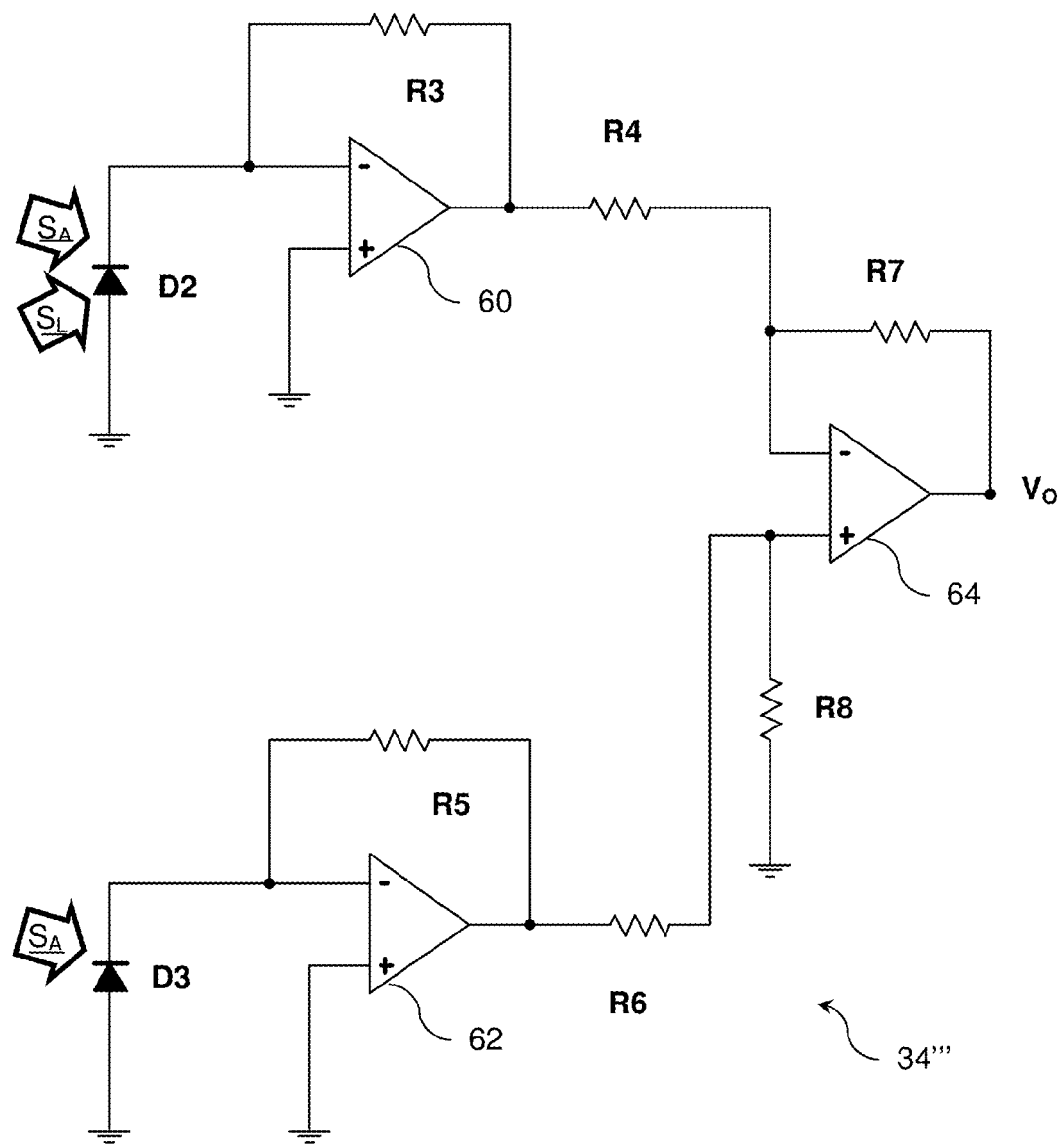
FIG. 5A is an electrical circuit diagram of another embodiment of the reception system of FIG. 3.

FIG. 5A is an electrical circuit diagram of another embodiment of a receiver 34''' for use in the system 30. As shown in FIG. 5A, the receiver 34''' provides a circuit having diodes (e.g., photodiodes) D2 and D3, a first operational amplifier 60, a second operational amplifier 62, a third operational amplifier 64, and resistors R3, R4, R5, R6, R7 and R8. The circuit illustrated in FIG. 5 can help reduce parasitic capacitance and improve bandwidth of the receiver 34''', thereby helping to improve data reception speeds.

An output of the diode D2 can be passed through the first operational amplifier 60 in an inverting configuration, that is, with an output current of the diode D2 connected to a negative terminal of the first operational amplifier 60. The resistor R3 can be electrically connected across the negative terminal and an output terminal of the first operational amplifier 60, such that the first operational amplifier 60 can be configured with divided negative feedback (i.e., resistor feedback). The resistor R4 can be electrically connected in series downstream of the first operational amplifier 60 and the resistor R3. An anode of the diode D2 and a positive terminal of the first operational amplifier 60 can each be electrically connected to ground.

Similarly, an output of the diode D3 can be passed through the second operational amplifier 62 in an inverting configuration, that is, with an output current of the diode D3 connected to a negative terminal of the second operational amplifier 62. The resistor R5 can be electrically connected across the negative terminal and an output terminal of the second operational amplifier 62, such that the second operational amplifier 62 can be configured with divided negative feedback (i.e., resistor feedback). The resistor R6 can be electrically connected in series downstream of the second operational amplifier 62 and the resistor R5. An anode of the diode D3 and a positive terminal of the second operational amplifier 62 can each be electrically connected to ground. In one embodiment, the diodes D2 and D3, the first and second operational amplifiers 60 and 62, the resistors R3 and R5, and the resistors R4 and R6 can, respectively, have identical or substantially identical configurations.

Outputs of the first and second operational amplifiers 60 and 62 can be passed through the third operational amplifier 64, such that the third operational amplifier 64 can be configured as a negative comparator (or subtractor) utilizing outputs of the first and second operational amplifiers 60 and 62. The resistor R7 can be electrically connected across the negative terminal and an output terminal of the third operational amplifier 64, such that the third operational amplifier can be configured with divided negative feedback. As shown in the illustrated embodiment, the output of the first operational amplifier 60 is input to a negative input terminal of the third operational amplifier 64, and the output of the second operational amplifier 62 is input to a positive input terminal of the third operational amplifier 64. The resistor R8 can be electrically connected from a location at the positive input of the third operational amplifier 64 to ground, such that the resistor R8 connection to ground can provide an escape path for bias currents. Use of the third operational amplifier 64 is optional, and the third operational amplifier 64 and the resistor R8 can be omitted entirely in further embodiments.

Although not labeled in FIG. 5A, for simplicity, a current $I_1$ can be generated by the diode D2 as a function of any and all received signals, for instance, as a total current produced by a current $I_L$ generated as a function of the received communication signal $S_L$ and a current $I_{A1}$ generated as a function of a received ambient noise signal $S_A$ (such as from the noise source 36 shown in FIG. 3). Moreover, a current $I_{A2}$ (not labeled in FIG. 5A) can be generated by the diode D3 as a function of the received ambient noise signal $S_A$. The output signal VO from the third operational amplifier 64 can effectively cancel the currents $I_{A1}$ and $I_{A2}$ generated as functions of the undesired received ambient noise signal $S_A$, leaving a current $I_L$ generated as a function of the desired communication signal $S_L$.

Solar panels (i.e., solar cell array modules) are not specifically designed as communication receiver diodes. Solar panels have the benefit of having a large surface area, which makes communication signal targeting easier; however, solar panels have a relatively low response to higher frequencies. A reason solar panel exhibit relatively low responses to high frequencies is that the photo/solar cells comprising the solar panels are generally PN junctions, which means there is a junction capacitor. A value of this junction capacitor is proportional to an area of the junction, so larger solar cells have worse bandwidths than smaller ones. One way to mitigate the relatively low response of solar panels is to virtually eliminate the effect of the junction capacitor, which can be done using one or more operational amplifiers.

Figure 5B:
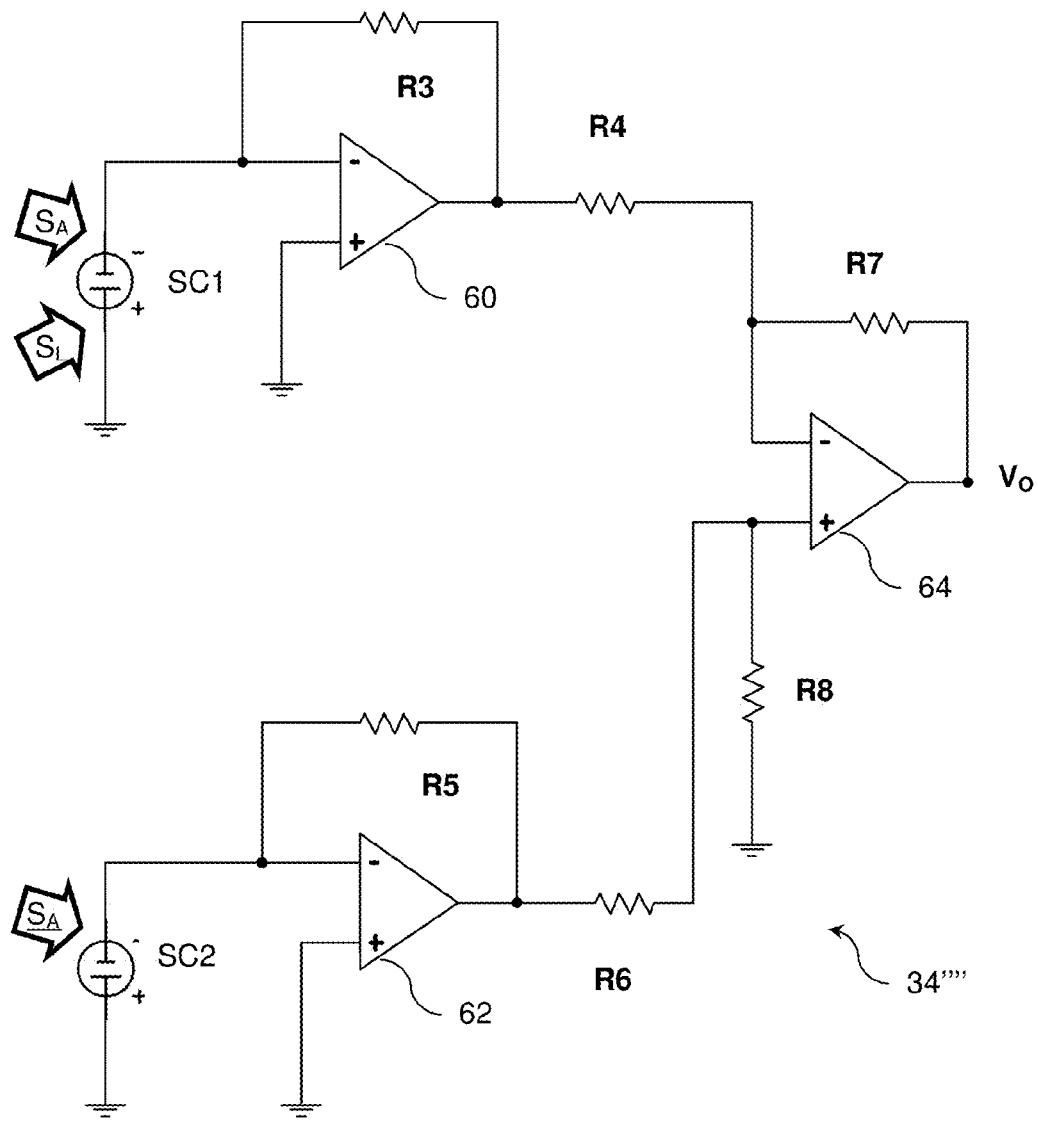
FIG. 5B is an electrical circuit diagram of another embodiment of the reception system of FIG. 3.

FIG. 5B is an electrical circuit diagram of yet another embodiment of a receiver 34'''' for use in the system 30. The embodiment shown in FIG. 5B is generally similar to that shown in FIG. 5A, however, in the circuit for the receiver 34'''' the diodes D2 and D3, respectively, are instead represented as solar cell modules SC1 and SC2 (which can each include any desired number of individual solar cells for given embodiment) that can each produce a current (i.e., using a photovoltaic effect to in turn produce a current) as a function of received signals. As with FIG. 5A, use of the third operational amplifier 64 in the circuit of FIG. 5B is optional, and the third operational amplifier 64 and the resistor R8 can be omitted entirely in further embodiments.

By connecting a receiver element (e.g., diode D2 or D3 or solar cell modules SC1 or SC2) between negative and positive input terminals of an operational amplifier, parasitic capacitance can be reduced. Equation 3 gives a voltage output $V_O$ for the circuits shown in FIGS. 5A and 5B, and Equation 4 gives gain $A_V$ for the circuits shown in FIGS. 5A and 5B. In Equations 3 and 4, $V_O$ is a voltage output for an output signal, $A_{V\,is\,gain}$, $I_L$ is a current generated as a function of the received communication signal $S_L$, R' is a resistance of each of resistors R3 and R5, R" is a resistance of each of resistors R4 and R6, and R7 is a resistance of the resistor R7.

$$V_O = \frac{I_L \cdot R' \cdot R7}{R''} \tag{3}$$

$$A_V = \frac{V_O}{I_L \cdot R'} = \frac{R' \cdot R7}{R''} \tag{4}$$

Bandwidth is no longer limited when the receivers 34''' and 34'''' are set up as illustrated in FIGS. 5A and 5B. Instead bandwidth is limited by the particular operational amplifiers 60, 62 and 64 used. Therefore, a preferred embodiment can utilize high-speed operational amplifiers. A bit rate for the embodiments shown in FIGS. 5A and 5B may be faster than the embodiments shown in FIGS. 4A-4C, by as much as 10 times or more, with increases from the order of approximately 100 kbit/sec. (FIGS. 4A-4C) to the order of 1 Mbit/sec. or more (FIGS. 5A and 5B) in some embodiments.

EXAMPLES

The present inventors have conducted experiments that have verified performance of the present invention. These experimental examples are described below.

The receivers used in the experiment were solar panels: One pair manufactured by Sanyo Energy, model number AM-1801CA, 53 mm×25 mm, and another pair manufactured by Parallax Inc., model number 750-00030, 125 mm×63 mm. There were two lasers used, a 532 nm laser (green), model number CPA-LP0080-2, and white light from an Illumin laser keychain light, model ESP 006. A 1 kHz sine wave was generated using a K and H IDL-800 Digital Lab, and transmitted via laser and white light LED. Power of the frequency components of the total incoming signal was examined for a two cases: with and without cancelation using photo-receivers. Results were collected using a National Instruments myDaq connected to a laptop computer.

Test A

Figure 1:
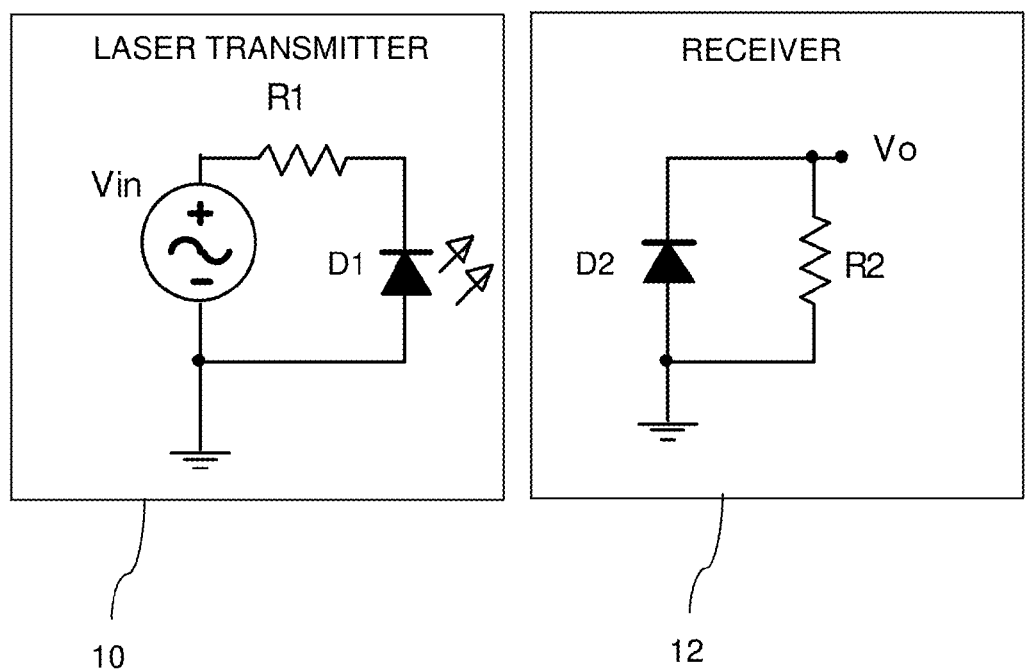
FIG. 1 is an electric circuit diagram of a prior art free space signal transmission and reception system.
Figure 6A:
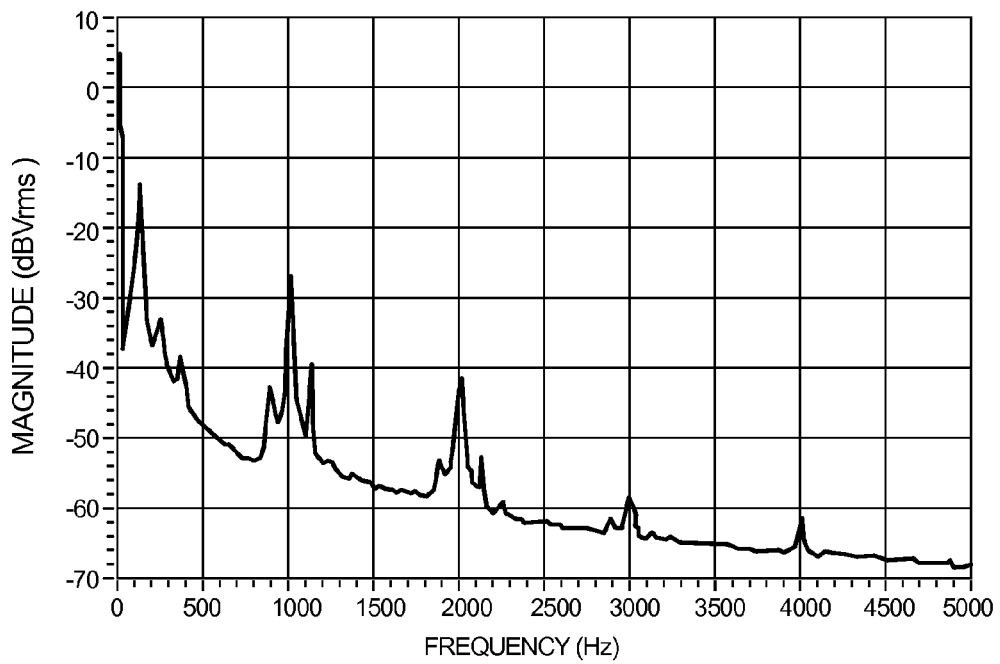
FIG. 6A is a graph of one measure of received signal quality of a prior art laser communication system.

FIG. 6A is a graph of one measure of received signal quality of a prior art laser communication system of the type illustrated in FIG. 1, having only a single receiving element, according to Test A. For purposes of the experiment of Test A, a single solar cell panel (a Parallax Inc., model number 750-00030 solar panel, 125 mm×63 mm) was used as the single receiving element, an Illumin laser keychain light (white light) LED, model ESP 006 as diode D1 generating a 1 kHz sine wave signal $S_L$ using a K and H IDL-800 Digital Lab signal generator 38, and indoor room lighting (i.e., light bulbs) as a source 36 of an ambient noise signal $S_A$. When the test was carried out indoors, a 60 Hz or 120 Hz component was expected from the light bulbs, which in fact appeared in the output signal in FIG. 6A at approximately 120 Hz. Both the undesired 120 Hz component and the desired 1 kHz component are present in the output signal $V_O$ when there is only one receiving element.

Figure 6B:
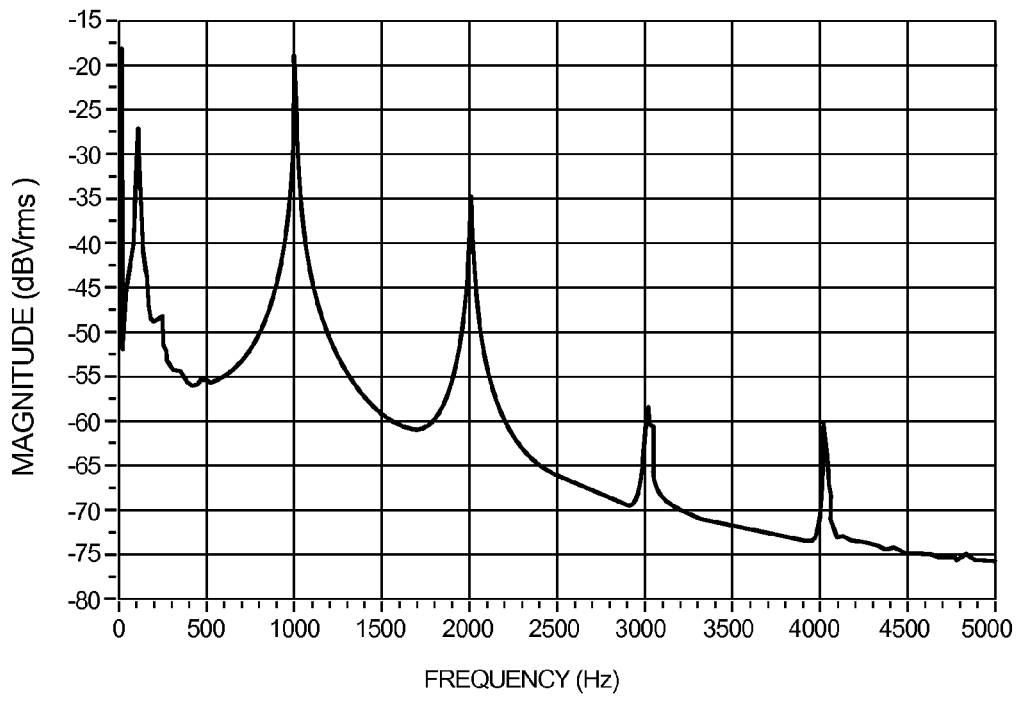
FIG. 6B is an example graph of one measure of received signal quality of an embodiment of a laser communication system according to the present invention, in one experiment.

FIG. 6B is an example graph of one measure of received signal quality of an embodiment of a laser communication system 30, using a circuit as illustrated in FIG. 4C (using a pair of separate Parallax Inc., model number 750-00030 solar panels, each 125 mm×63 mm), according to Test A. FIGS. 6A and 6B each plot Magnitude (in $dBV_{rms}$) vs. Frequency (in Hz) for an output signal ($V_O$) and the same laser communication signal and ambient noise signal equipment as used with respect to the graph in FIG. 6A.

With two receivers canceling out each other, power of what constitutes ambient light indoors (e.g., noise from light bulbs) is significantly reduced. An undesired 120 Hz noise component due in large part to ambient light drops from a strength (Magnitude) of approximately −12 dB (in the prior art configuration of FIG. 6A) to approximately −26 dB (in FIG. 6B). A gain from approximately −26 dB (in the prior art configuration of FIG. 6A) to approximately −18 db (in FIG. 6B) is achieved for reception of the communication signal $S_L$ (a 2½ times increase) when the receivers are canceling each other out. The 1 kHz signal component is also much "cleaner" (i.e., less jagged and more smooth off-peak) in FIG. 6B. In this case, cross-coupling two receivers not only reduced noise from ambient light ($S_A$), but increased gain from the intended communication signal ($S_L$).

Test B

Another test similar to Test A was performed using a different communication signal source. For purposes of Test B, a single solar cell panel (a Parallax Inc., model number 750-00030 solar panel, 125 mm×63 mm) was used as the single receiving element, a 532 nm laser (green), model number CPA-LP0080-2 as diode D1 generating a 1 kHz sine wave signal $S_L$ using a K and H IDL-800 Digital Lab signal generator 38, and indoor room lighting (i.e., light bulb output) as a source 36 of an ambient noise signal $S_A$. The 1 kHz component increased slightly for the cross-coupled configuration, and the 120 Hz component dropped from a strength/Magnitude of approximately −12 dB to approximately −25 dB, a drop of about 4½ times.

In the experiments, the white (ambient) light in Test A covered the entire receiving panel(s), whereas the green laser in Test B did not, so the effect of cancelation may be different because of these two different methods of input.

Test C

Figure 7A:
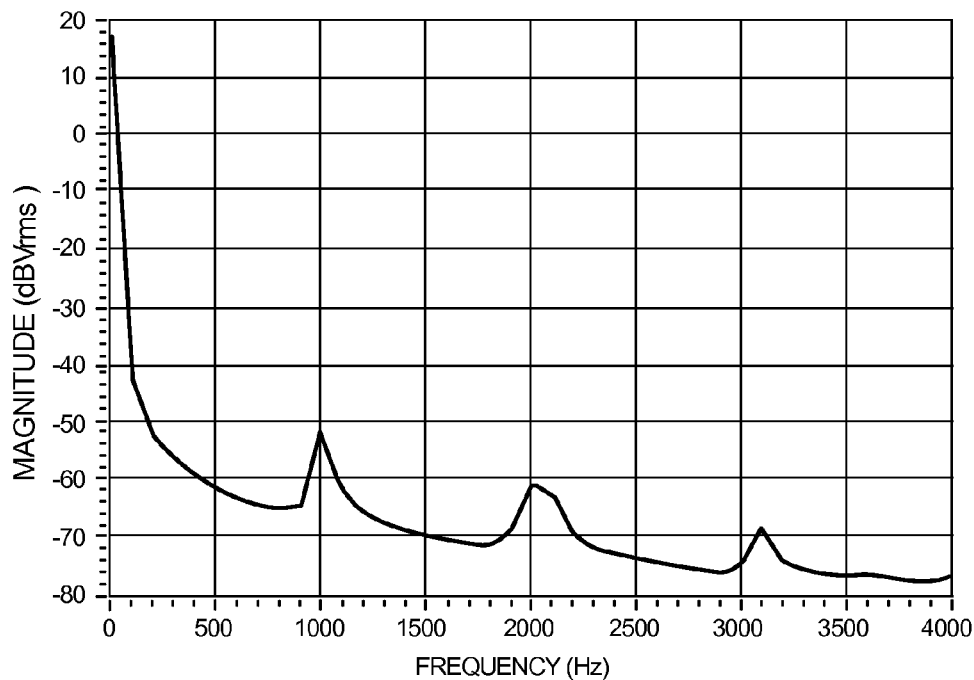
FIG. 7A is a graph of one measure of received signal quality of a prior art laser communication system.

FIG. 7A is a graph of one measure of received signal quality of a prior art laser communication system of the type illustrated in FIG. 1, having only a single receiving element, according to Test C. For purposes of the experiment of Test C, a single solar cell panel (a Sanyo Energy, model number AM-1801CA, 53 mm×25 mm) was used as the single receiving element, a 532 nm laser (green), model number CPA-LP0080-2 as diode D1 generating a 1 kHz sine wave signal $S_L$ using a K and H IDL-800 Digital Lab signal generator 38, and outdoor light (i.e., sunlight) as a source 36 of an ambient noise signal $S_A$. Because Test C was performed outdoors, no 120 Hz component was expected and none was detected.

Figure 7B:
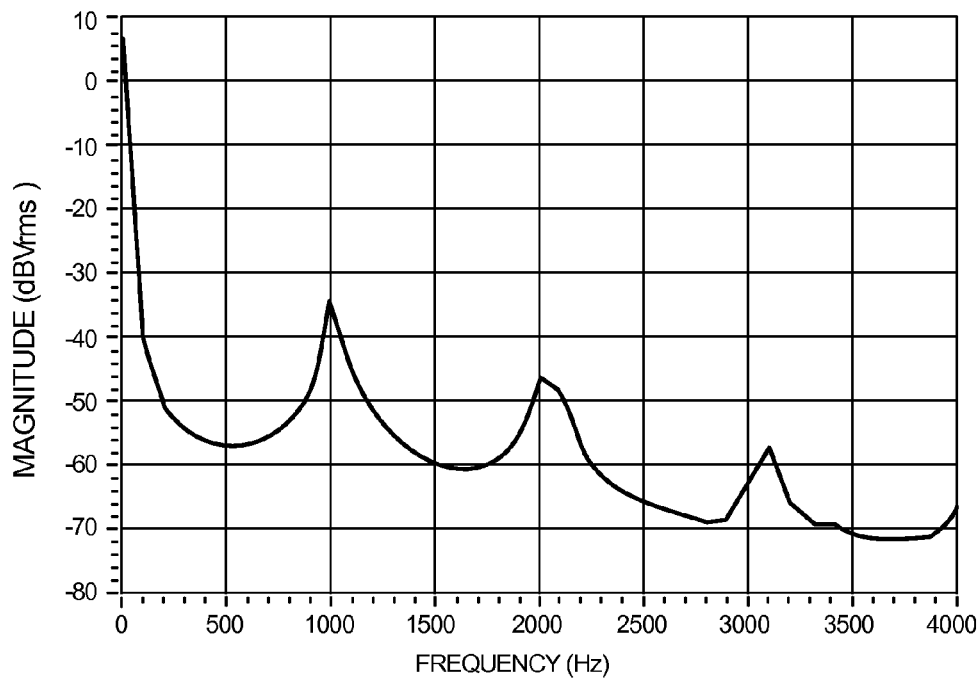
FIG. 7B is an example graph of one measure of received signal quality of an embodiment of a laser communication system according to the present invention, in another experiment.

FIG. 7B is an example graph of one measure of received signal quality of an embodiment of a laser communication system 30, using a circuit as illustrated in FIG. 4C (using a pair of separate Sanyo Energy, model number AM-1801CA, each 53 mm×25 mm), according to Test C. FIGS. 7A and 7B each plot Magnitude (in $dBV_{rms}$) vs. Frequency (in Hz) for an output signal ($V_O$) and the same laser communication signal and ambient noise signal equipment as used with respect to the graph in FIG. 7A.

With the smaller 53 mm×25 mm solar panels used in Test C, the effects of a differential, cross coupled receiving elements are again similar to Tests A and B, with the panels arranged in differential mode producing better results. For a 1 kHz incoming signal ($S_L$), the cancelation effects from a second photo-receiver (as in FIG. 7B) as opposed to only one receiving element (as in the prior art configuration in FIG. 7A) increases power of the 1 kHz signal from approximately −51 dB to approximately −35 dB, a more than 6 times increase.

Figure 8A:
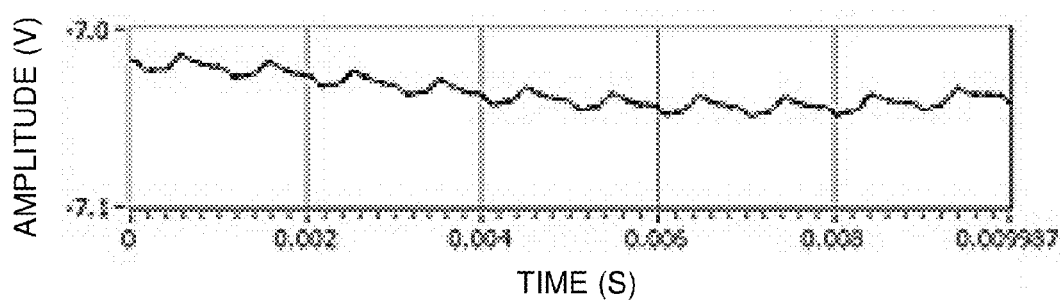
FIG. 8A is a graph of another measure of received signal quality of a prior art laser communication system.
Figure 8B:
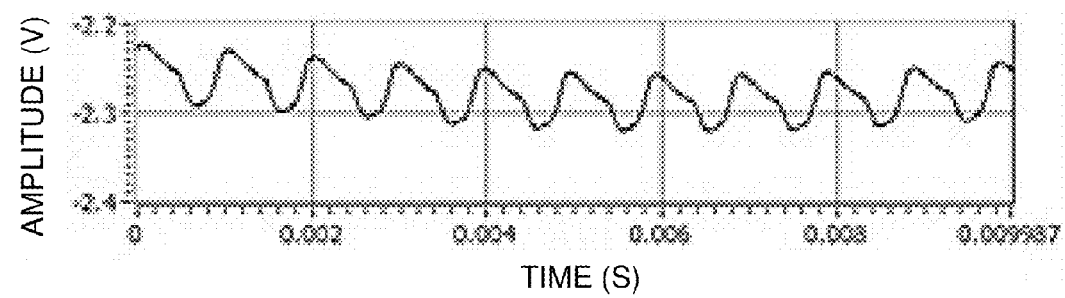
FIG. 8B is an example graph of the other measure of received signal quality of an embodiment of a laser communication system according to the present invention, in the experience of FIGS. 7A and 7B.

FIG. 8A is a graph of another measure of received signal quality of a prior art laser communication system of the type illustrated in FIG. 1, having only a single receiving element, according to Test C; and FIG. 8B is an example graph of that measure of received signal quality of the embodiment of the laser communication system 30, using a circuit as illustrated in FIG. 4C (using a pair of separate Sanyo Energy, model number AM-1801CA, each 53 mm×25 mm), according to Test C. As shown in FIG. 8B, the output signal waveform of FIG. 8B had a much higher peak-to-peak amplitude that with the prior art single receiver waveform shown in FIG. 8A.

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, incidental signal distortions, alignment or shape variations induced by thermal or optical operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, the type of receiving elements or devices used to receive communication signals and ambient noise signals can vary as desired for particular applications, though only a few representative examples have been described and illustrated in detail herein.

The invention claimed is:

1. A free space communications apparatus comprising:
a first receiving element operatively exposed to free space and configured to receive a communication signal and an ambient noise signal both transmitted through the free space, and to generate a first current as a function of any and all received signals;
a second receiving element operatively exposed to the free space and electrically coupled with the first receiving element to receive the ambient noise signal and to generate a second current as a function of any and all received signals; and
an output signal produced as a function of the communication signal received by the first receiving element, wherein the first and second receiving elements are electrically connected in a circuit that cancels at least a portion of the first current as a function of the second current to produce the output signal.

2. The apparatus of claim 1, wherein first and second receiving elements are electrically cross-coupled in the circuit.

3. The apparatus of claim 1, wherein the first and second receiving elements each comprise optical detector devices.

4. The apparatus of claim 1, wherein the first receiving element comprises a first solar cell array module, and wherein the second receiving element comprises a second solar cell array module.

5. The apparatus of claim 1, wherein the communication signal is focused on a region within a perimeter of the first receiving element.

6. The apparatus of claim 1 and further comprising:
a substrate, wherein the first and second receiving elements are located adjacent one another on a first surface of the substrate.

7. The apparatus of claim 1 and further comprising:
a resistor electrically connected in parallel between the first and second receiving elements.

8. The apparatus of claim 1 and further comprising:
a first operational amplifier, wherein an output of the first receiving element is passed through the first operational amplifier in an inverting configuration; and
a second operational amplifier, wherein an output of the second receiving element is passed through the second operational amplifier in an inverting configuration.

9. The apparatus of claim 8, wherein the first and second operational amplifiers are each configured with divided negative feedback.

10. The apparatus of claim 8 and further comprising:
a third operational amplifier configured as a negative comparator utilizing outputs of the first and second operational amplifiers.

11. The apparatus of claim 10, wherein the third operational amplifier is configured with divided negative feedback.

12. The apparatus of claim 10 and further comprising:
a resistor connected to ground at a positive terminal of the third operational amplifier.

13. The apparatus of claim 1 and further comprising:
means for reducing parasitic capacitance of at least one of the first and second receiving elements.

14. A method for line-of-sight signal communication, the method comprising:
receiving a line-of-sight communication signal at a first receiving element;
receiving an ambient noise signal at the first receiving element;
receiving the ambient noise signal at a second receiving element;
canceling the ambient noise signal received by both the first and second receiving elements; and
producing an output signal representative of the line-of-sight communication signal after canceling the ambient noise signal received by both the first and second receiving elements.

15. The method of claim 14 and further comprising:
focusing the line-of-sight communication signal on a region within a perimeter of the first receiving element.

16. The method of claim 14, wherein the line-of-sight communication signal comprises a laser communication signal, and wherein the first receiving element comprises a photo detector, the method further comprising:
generating a current with the first receiving element as a function of the received laser communication signal and the ambient noise signal.

17. The method of claim 14 and further comprising:
generating a first DC current with the first receiving element from the line-of-sight communication signal and the ambient noise signal; and
generating a second DC current with the second receiving element from the ambient noise signal.

18. The method of claim 14 and further comprising:
reducing a parasitic capacitance by passing outputs of the first and second receiving elements through operational amplifiers.

19. The method of claim 14 and further comprising:
passing an output of the first receiving element through a first inverting operational amplifier;
passing an output of the second receiving element through a second inverting operational amplifier; and
passing the outputs of the first and second inverting operational amplifiers through a third inverting operational amplifier, wherein the output signal is produced as a function of an output of the third inverting operational amplifier.

20. The method of claim 14 and further comprising:
providing the first and second receiving elements adjacent one another on a single substrate.

21. The method of claim 14 and further comprising:
transmitting the line-of-sight communication signal from a ground-based location; and
encoding data in the line-of-sight communication signal using a communication signal protocol.

22. The method of claim 14 and further comprising:
moving the first receiving element, wherein the first receiving element is carried by a vehicle in flight, and wherein the first receiving element is exposed to ambient light.

23. The method of claim 14 and further comprising:
receiving another line-of-sight communication signal at the second receiving element when receipt of the line-of-sight communication signal at the first receiving element has ceased.

24. A communications system comprising:
an optical signal transmitter configured to transmit a signal beam across free space;
a first receiving element configured to receive the signal beam from the optical signal transmitter and an ambient noise signal, and to generate a first current as a function of any and all received signals, wherein the signal beam is focused within a perimeter of the first receiving element;

a second receiving element electrically cross coupled with the first receiving element to receive the ambient noise signal and to generate a second current as a function of any and all received signals; and an output signal produced as a function of the signal beam received by the first receiving element, wherein electrical coupling of the first and second receiving elements cancels at least a portion of the first current as a function of the second current to produce the output signal.

25. The system of claim 24 and further comprising:
means for reducing parasitic capacitance of at least one of the first and second receiving elements.

26. The system of claim 24, wherein the first receiving element is operatively exposed to free environmental space, and wherein the second receiving element is operatively exposed to the free environmental space.

* * * * *

UNITED STATES PATENT AND TRADEMARK OFFICE
CERTIFICATE OF CORRECTION

PATENT NO. : 9,154,228 B2  
APPLICATION NO. : 13/652256  
DATED : October 6, 2015  
INVENTOR(S) : Faruque et al.

Page 1 of 1

It is certified that error appears in the above-identified patent and that said Letters Patent is hereby corrected as shown below:

In the Specification

Col. 1, Line 5-11

Delete

"STATEMENT OF GOVERNMENT INTEREST
This invention was made with government support under FA4861-06-C-C006 awarded by The United States Department of Defense and FA8650-09-C1600 awarded by the United States air Force Research Laboratory. The government has certain rights in the invention."

Signed and Sealed this  
Ninth Day of February, 2016

Michelle K. Lee  
*Director of the United States Patent and Trademark Office*